Figure 1:
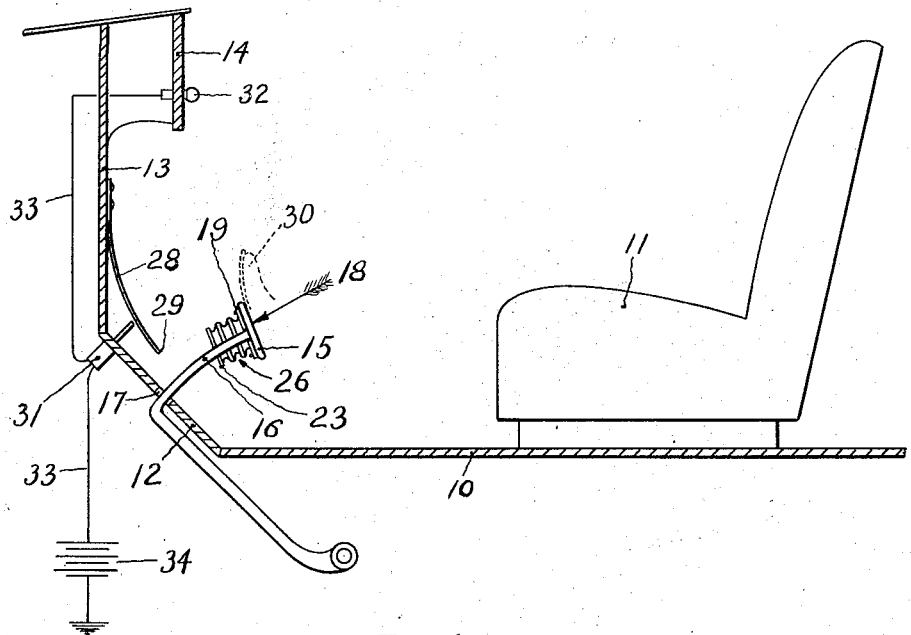

Feb. 25, 1936.  G. L. SMITH  2,031,741

INDICATOR

Filed Oct. 4, 1935

INVENTOR.
GEORGE L. SMITH.

ATTORNEY.

Patented Feb. 25, 1936

2,031,741

UNITED STATES PATENT OFFICE 2,031,741

INDICATOR

George L. Smith, Washington, D. C., assignor to United States Ordnance Company, Washington, D. C., a corporation of Virginia Application October 4, 1935, Serial No. 43,586

7 Claims. (Cl. 177—311)

My invention relates to automobile brakes and comprises indicating means to warn the driver of the vehicle when his brakes require adjustment, so that this adjustment can be made before the brakes become unsafe.

It is a well known fact that, with internal brakes, now generally used, any heavy brake application to make a sudden stop results in considerable heating of the brake drums and the resulting expansion of these drums moves them away from the brake shoes. To follow up this movement the brake pedal has to be depressed a corresponding amount. If, when making such a sudden stop, the brakes are so badly worn that the pedal almost hits the toe board, then when drum expansion develops due to heat, the pedal will be further depressed, actually hitting this toe board and preventing any further brake application. As a result the stopping distance of the car is greatly increased at a time when, due to an emergency, the driver wishes to stop as suddenly as possible.

While the amount of follow up of the foot pedal due to drum expansion caused by heat is a variable, depending upon the design of each individual brake, it may be assumed that it will never be more than one fourth of the pedal stroke, or one and one half inches for a total available pedal stroke of about six inches. Therefore, to be sure of having this one and one half inches of pedal stroke in reserve at all times I provide between the pedal and toe board of the vehicle an indicating device which will signal the driver when the foot pedal has reached a point one and one half inches from the toe board; or in other words a position spaced from the limits of its movement.

Figure 2:
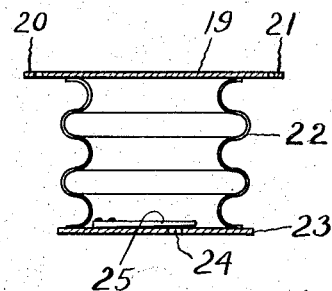

In the drawing chosen to illustrate my invention the scope whereof is set forth in the claims:

Figure 1 is a sectional elevation showing the brake pedal projecting through the toe board of the vehicle and with my invention associated; and Figure 2 is an enlarged sectional view of the bellows shown in Figure 1.

In the drawing, 10 represents the floor of the vehicle, 11 the driver's seat, 12 the toe board, 13 the dash and 14 the instrument board. The brake pedal 15 is fixed to the curved lever arm 16 which extends through the hole 17 in the toe board 12. As it is well known how the depression of pedal 15 actuates the brakes of an automobile, connections to these brakes are not shown. It is sufficient for the disclosure of my invention to know that pressure in the direction of arrow 18 on pedal 15 brings the brake shoes into operating engagement with their respective drums; that the stroke of this pedal may be divided into, first, a movement to take up the running clearance of the brakes and effect engagement between the shoes and their drums, second, further movement to build up the amount of brake power desired, third, a follow up movement resulting from drum expansion due to heat; and that as the brakes wear down this first movement is correspondingly increased.

Referring to Figure 2 the bellows shown therein constitutes an audible signal device consisting of a plate 19 having ears 20 and 21 for securing the plate to another part, the collapsible bellows 22 secured to this plate 19 and an opposite plate 23 for closing the other end of the bellows. The plate 23 is provided with an opening 24 partially covered by a reed 25 so that a sound will be made by the vibrations of the reed when air passes through the opening by operation of the bellows.

This bellows may be used in connection with the brake pedal by securing it to the under side of the pedal as shown at 26. In this position the plate 23 eventually comes in contact with toe board 12 as the pedal is depressed further and further to compensate for wear of the brake lining.

To further increase the certainty of warning the driver of the vehicle I utilize the sense of touch as an indicator. A spring 28 is secured to the dash 13 with its end 29 placed above and just clear of the path of the pedal where the driver's toe 30 will come in contact with it when the pedal gets too near the toe board. This spring will yield to the pressure of the driver's toe and permit him to depress the pedal all the way down, but will be sufficiently strong to be felt by him.

To still further increase the certainty of warning I provide a visual signal in the form of an electric light as follows. A contact maker and braker 31 may be secured to the toe board 12 where it will be operated by the spring 28 when depressed by the driver's toe 30. A light bulb 32 is mounted on the instrument board 14 and suitable wire connections 33 are provided between light 32, switch 31 and the car's battery 34.

I claim:

1. In an operating mechanism for a vehicular internal brake, a brake pedal, a stop limiting the maximum brake applying movement of the pedal, and signal means positioned to be operated during the movement of said pedal in applying the brake when said movement is less than said maximum movement by an amount which is insufficient to permit proper application of the brake when its drum has expanded due to heating.

2. In an operating mechanism for a vehicular internal brake, a brake pedal, a stop limiting the maximum brake applying movement of the pedal, and combined sense of touch and visual signal means positioned to be operated during the movement of said pedal in applying the brake when said movement is less than said maximum movement by an amount which is insufficient to permit proper application of the brake when its drum has expanded due to heating.

3. In an operating mechanism for a vehicular internal brake, a brake pedal, a stop limiting the maximum brake applying movement of the pedal, and audible signal means carried by the pedal and operated by engagement with the stop when the brake applying movement of the pedal is less than said maximum movement by an amount which is insufficient to permit proper application of the brake when its drum has expanded due to heating.

4. In an operating mechanism for a vehicular internal brake, a brake pedal, a stop limiting the maximum brake applying movement of the pedal, and sense of touch signal means positioned to be operated during the movement of said pedal in applying the brake when said movement is less than said maximum movement by an amount which is insufficient to permit proper application of the brake when its drum has expanded due to heating.

5. In an operating mechanism for a vehicular internal brake, a brake pedal, a stop limiting the maximum brake applying movement of the pedal, and visual signal means positioned to be operated during the movement of said pedal in applying the brake when said movement is less than said maximum movement by an amount which is insufficient to permit proper application of the brake when its drum has expanded due to heating.

6. In an operating mechanism for a vehicular internal brake, a brake pedal, a stop limiting the maximum movement of said pedal, and signal means carried entirely by the pedal and operated by contact with said stop before said maximum movement is reached.

7. In an operating mechanism for a vehicular internal brake, a brake pedal, a stop limiting the maximum movement of said pedal, and signal means carried entirely by the pedal and operated before said maximum movement is reached.

GEORGE L. SMITH.